(12) United States Patent
Stroud et al.

(10) Patent No.: US 9,650,797 B2
(45) Date of Patent: May 16, 2017

(54) MOBILE STAGE WALL PANEL SYSTEM

(71) Applicant: Progressive Products, Inc., Pittsburg, KS (US)

(72) Inventors: Richard V. Stroud, Pittsburg, KS (US); Todd N. Allison, Pittsburg, KS (US); Jimmie E. Pingree, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 0 days.

(21) Appl. No.: 15/090,336

(22) Filed: Apr. 4, 2016

(65) Prior Publication Data

US 2016/0289985 A1  Oct. 6, 2016

Related U.S. Application Data

(60) Provisional application No. 62/142,984, filed on Apr. 3, 2015.

(51) Int. Cl.
*E04H 3/28* (2006.01)
*G05B 15/02* (2006.01)
*B60P 3/025* (2006.01)

(52) U.S. Cl.
CPC .............. *E04H 3/28* (2013.01); *B60P 3/0252* (2013.01); *G05B 15/02* (2013.01)

(58) Field of Classification Search
CPC ..... E04H 3/28; E04H 3/24; E04H 3/10; B60P 1/64; B60P 3/0252; B60P 3/025; E04B 1/34357; E04B 1/34384; E04B 2001/34394; E04B 1/344
See application file for complete search history.

(56) References Cited

U.S. PATENT DOCUMENTS

| | | | |
|---|---|---|---|
| 2,052,757 A | 9/1936 | Fitch | |
| 2,143,235 A | 1/1939 | Bassett | |
| 2,857,993 A | 10/1958 | Terrell | |
| 3,002,557 A | 10/1961 | Roth et al. | |
| 3,044,540 A | 7/1962 | Hammersley | |
| 3,181,203 A * | 5/1965 | Wenger | E04B 1/34336 248/354.6 |
| 3,258,884 A * | 7/1966 | Wenger | E04H 3/22 52/182 |
| 3,417,518 A | 12/1968 | Christopher | |
| 3,433,500 A | 3/1969 | Christensen | |
| 3,527,470 A | 9/1970 | Ord | |
| 3,547,459 A | 12/1970 | Lapham | |
| 3,620,564 A | 11/1971 | Wenger et al. | |
| 3,633,324 A | 1/1972 | Cuylits | |

(Continued)

*Primary Examiner* — Adriana Figueroa
*Assistant Examiner* — Jessie Fonseca
(74) *Attorney, Agent, or Firm* — Law Office of Mark Brown, LLC; Christopher M. DeBacker; Mark E. Brown

(57) ABSTRACT

A mobile stage which transforms between a first, transport position and a second, deployed position. A number of modular wall panels which act as a barrier between the interior and the exterior of the stage. This barrier is weather resistant by use of weather stripping in between the panels and additionally serves to protect from unauthorized access to any contents stored inside the stage itself when in transportation mode. The wall panels may be selectively remoted and replaced by stairways and other stage components. The upper wall panels are temporarily engaged by a roof of the mobile stage.

9 Claims, 8 Drawing Sheets

(56) References Cited

U.S. PATENT DOCUMENTS

| | | |
|---|---|---|
| 3,908,787 A | 9/1975 | Wenger et al. |
| 3,984,949 A | 10/1976 | Wahlquist |
| 3,985,254 A | 10/1976 | Grandury |
| 4,026,076 A | 5/1977 | Analetto |
| 4,232,488 A | 11/1980 | Hanley |
| 4,464,868 A | 8/1984 | Howroyd |
| 4,535,933 A | 8/1985 | Kuiper |
| 4,720,945 A * | 1/1988 | Berranger ............ B60P 3/0252 52/143 |
| 4,869,030 A | 9/1989 | Clark |
| 4,883,306 A | 11/1989 | Stucky |
| 4,917,217 A | 4/1990 | Rogers et al. |
| 4,934,113 A | 6/1990 | Hall et al. |
| 4,949,649 A | 8/1990 | Terres et al. |
| 5,078,442 A | 1/1992 | Rau et al. |
| 5,094,285 A | 3/1992 | Murray |
| 5,115,608 A | 5/1992 | Abraham et al. |
| 5,152,109 A | 10/1992 | Boers |
| RE34,468 E | 12/1993 | Rau et al. |
| 5,327,698 A | 7/1994 | Uhl |
| 5,375,899 A | 12/1994 | Wright |
| 5,398,463 A | 3/1995 | Wright |
| 5,400,551 A | 3/1995 | Uhl |
| 5,417,468 A | 5/1995 | Baumgartner et al. |
| 5,454,441 A | 10/1995 | Jines |
| 5,524,691 A | 6/1996 | Jines |
| 5,546,709 A | 8/1996 | Decker et al. |
| 5,622,011 A | 4/1997 | Jines |
| 5,651,405 A | 7/1997 | Boeddeker et al. |
| 5,706,616 A | 1/1998 | Fernandez |
| 5,716,090 A * | 2/1998 | Chang .................. B60P 3/0252 296/26.01 |
| 5,761,854 A | 6/1998 | Johnson et al. |
| 5,875,591 A | 3/1999 | Jines |
| 5,924,465 A | 7/1999 | Malott |
| 5,947,502 A | 9/1999 | Kammerzell et al. |
| 6,058,671 A * | 5/2000 | Strickland ............ E04B 1/6137 411/539 |
| 6,085,861 A | 7/2000 | Jines |
| 6,393,769 B1 * | 5/2002 | Mertik ...................... E04H 3/28 296/162 |
| 6,407,798 B2 | 6/2002 | Graves et al. |
| 6,434,895 B1 | 8/2002 | Hosterman et al. |
| 6,499,258 B1 | 12/2002 | Borglum |
| 6,997,495 B1 | 2/2006 | Groezinger |
| 7,213,869 B1 | 5/2007 | McClellan |
| 7,500,285 B2 | 3/2009 | Willis |
| 7,506,405 B2 | 3/2009 | Willis |
| 2002/0062605 A1 | 5/2002 | Matthews |
| 2004/0108750 A1 | 6/2004 | Park |
| 2008/0236055 A1 | 10/2008 | Laprise |
| 2009/0126281 A1 | 5/2009 | Santini |
| 2010/0024314 A1 | 2/2010 | Pope |
| 2011/0031237 A1 * | 2/2011 | Bilchinsky ............ G06Q 30/04 219/679 |
| 2012/0096775 A1 * | 4/2012 | Allison ................ B60P 3/0252 52/7 |
| 2012/0272585 A1 * | 11/2012 | Bilsen ...................... E04H 3/28 52/7 |
| 2013/0067829 A1 * | 3/2013 | Johnstone ................ E04H 3/26 52/7 |
| 2014/0069025 A1 * | 3/2014 | Maxam ...................... A63J 1/02 52/6 |

* cited by examiner

MOBILE STAGE WALL PANEL SYSTEM

CROSS-REFERENCE TO RELATED APPLICATION

This application claims priority in U.S. Provisional Patent Application No. 62/142,984 filed Apr. 3, 2015, which is incorporated herein by reference.

BACKGROUND OF THE INVENTION

1. Field of the Invention

The present invention relates generally to a mobile hydraulic stage and method for use thereof, and more specifically to a mobile hydraulic stage with removable wall panels and an integrated wireless control via mobile computing device.

2. Description of the Related Art

Mobile performance stages are commonly used for temporary venues, performances, or rallies. Typical mobile performance stages must be assembled on site. Modern mobile stages may come in the form of a trailer, wherein the mobile stage is collapsible to a compact and mobile unit.

Mobile stages are often an economical alternative to erecting a permanent stage at a site. The typical reasons for electing to use a mobile stage include temporary use, cost, and reliability. Cutting the costs of using a mobile stage provides additional incentive for using a mobile stage. The simplest way to cut costs would be to reduce the number of persons and steps required to setup and operate the stage. Costs are also saved when the owner of a mobile stage knows the stage will last. These cost savings can be passed on to customers, increasing the incentive to use one mobile stage over another.

What is needed is a highly transportable stage system with wall panel elements which quickly allow the stage to be transformed from a compact/transportation position to a functional stage position and back.

Heretofore there has not been available a system or method for a mobile hydraulic stage with the advantages and features of the present invention.

SUMMARY OF THE INVENTION

The present invention generally provides a mobile stage which transforms between a first, transport position and a second, deployed position. A primary component of the present invention is a number of modular wall panels which act as a barrier between the interior and the exterior of the stage. This barrier is weather resistant by use of weather stripping in between the panels and additionally serves to protect from unauthorized access to any contents stored inside the stage itself when in transportation mode.

When the stage is set up, the top row of panels are removed and the bottom row of panels serve as handrails (e.g. fall deterrent) along the back edge of the stage. All of the panels are designed to be modular and interchangeable, though the bottom panels also include kick plates to protect the interior of the panels.

The bottom panels are secured to the stage floor by at least two removable bolts (or other connection elements) going through the bottom edge of the panel. There are two identical holes (for either bolts or pins) on the top edge of each of these panels that allow them to be joined to a second row of panels.

The top row of panels have identical bottom edge bolt holes as the bottom panels, however, they are designed with a "track block" at two points on the top edge that allow them to be slid into place within a corresponding "female" track that is part of the roof framing of the stage itself.

The panels could feasibly be designed in such a way as to form a wall/barrier of any suitable size used to cover any open side of a stage, even though the most common use would be to use them along the back edge of a non-symmetric stage design as shown in the figures. Although the top row and bottom row panel designs differ, building a taller wall would simply require additional panels reflecting the bottom panel design. A wall of increased width would require additional top and bottom panels as necessary to construct the wall.

The panels are made from metal square tubing (e.g. aluminum), but the design allows them to be made from virtually any metal as long as the cross section of the material itself is square or rectangular to facilitate horizontal or vertical stacking.

When the stage is in set up and only the lower row of panels are in use, any individual panel can be removed and a staircase or corresponding stage accessory can be placed in the corresponding void.

Typical accessories that could be designed to fit in this void would be stage deck extensions, staircases or an alternative handrail design.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Additional examples include computing devices such as a mobile smart device including a display device for viewing a typical web browser or user interface will be commonly referred to throughout the following description. The type of device, computer, display, or user interface may vary when practicing an embodiment of the present invention. A computing device could be represented by a desktop personal computer, a laptop computer, "smart" mobile phones, PDAs, tablets, or other handheld computing devices. Said terminology will include the words specifically mentioned, derivatives thereof and words of similar meaning.

II. Preferred Embodiment Mobile Stage System 2

Figure 1:
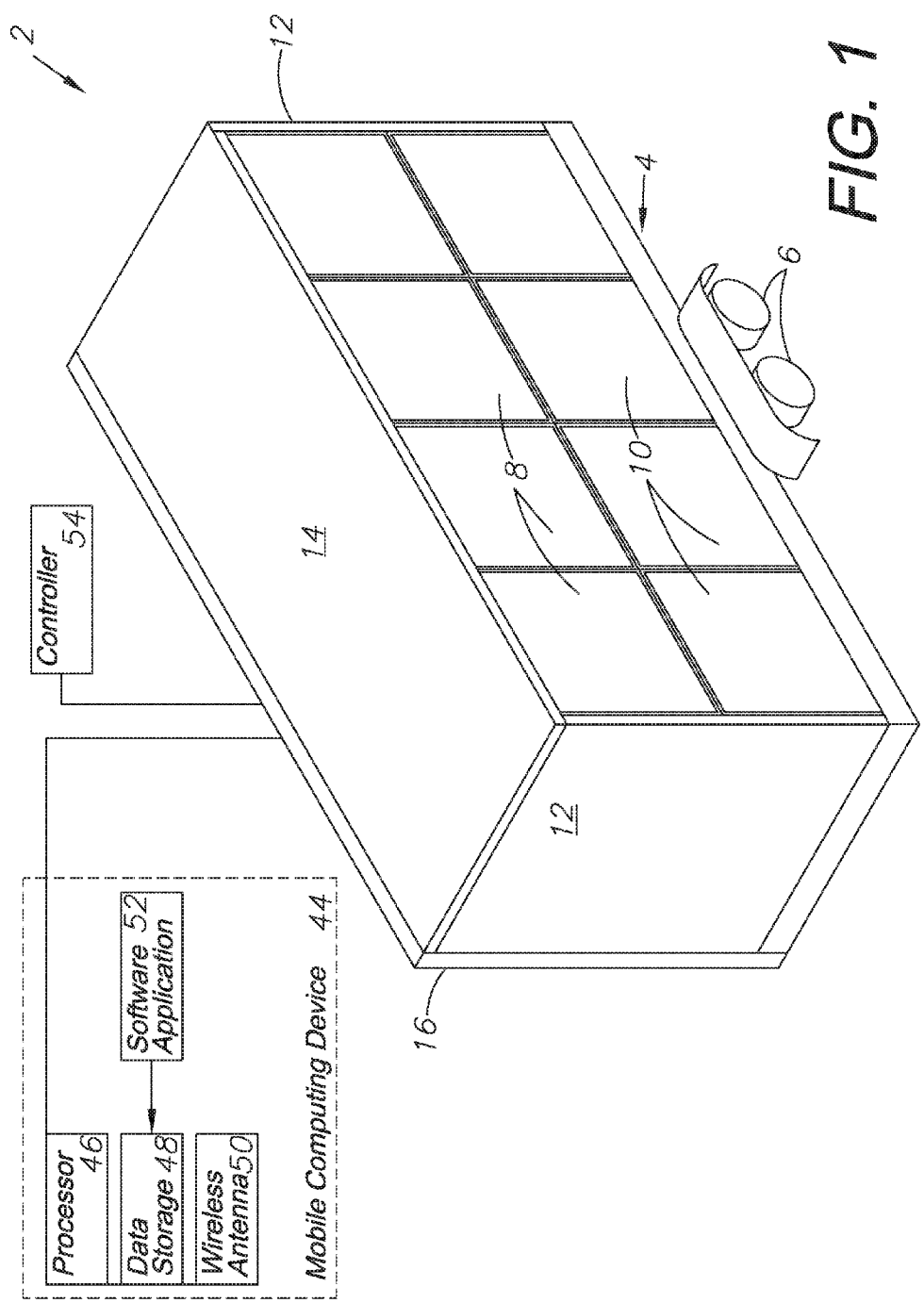
FIG. 1 is a three dimensional isometric view of a preferred embodiment of the present invention in a first position including diagrammatic representation of a wireless mobile device element thereof.

Referring to the figures in more detail, FIG. 1 shows a mobile stage system 2 primarily including a trailer element 4 with wheels 6 for transporting the stage, and a plurality of lower 10 and upper 8 wall panels forming at least one wall of the stage assembly. FIG. 1 demonstrates the stage in a first, transport position where the walls 12, roof 14, and stage cover 16 are collapsed and compact arrangement.

Figure 2:
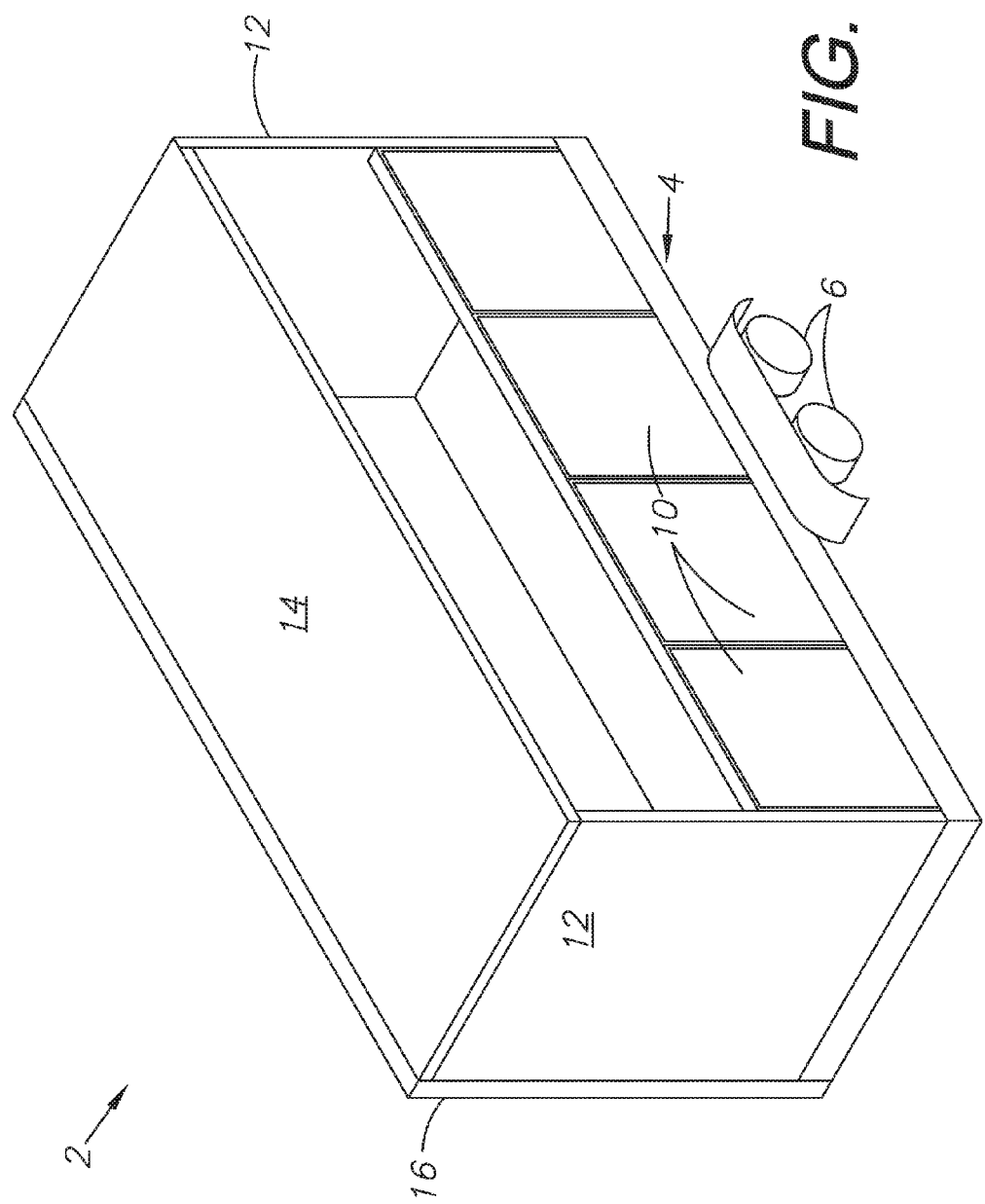
FIG. 2 is a three dimensional isometric view of a preferred embodiment of the present invention in a second position.

FIG. 2 shows the same arrangement as FIG. 1 with the upper wall panels 8 being removed. These panels (as shown in more detail in FIGS. 6-8) fit into tracks or guides (not shown) along the interior edge of the roof 14. The upper panels 8 hang from or slide into these tracks, and if the stage roof 14 and walls 12 are raised using the risers 22, the upper panels 8 will rise with the roof 14 and can be taken down from there. Alternatively, the panels could be removed at any time.

Figure 3:
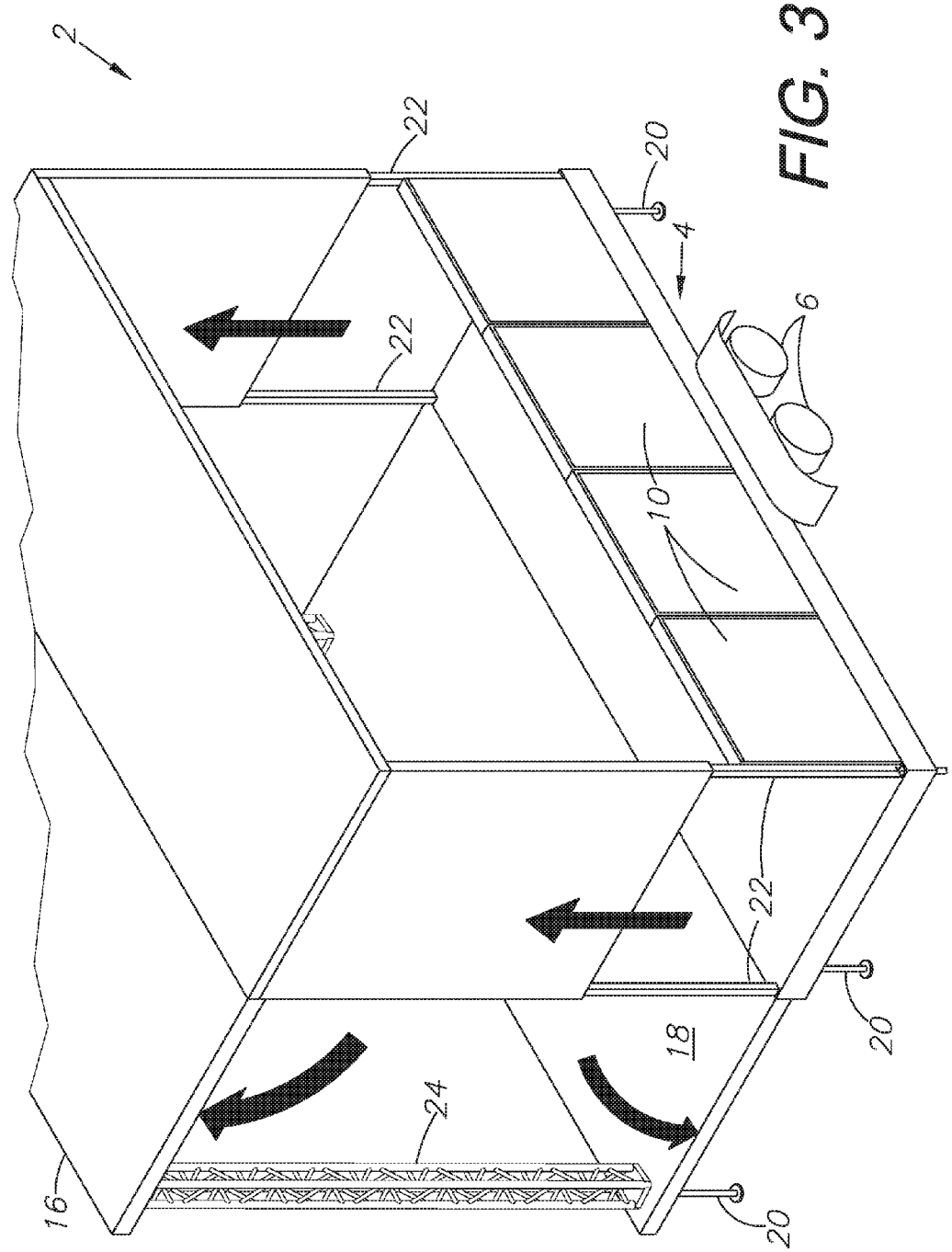
FIG. 3 is a three dimensional isometric view of a preferred embodiment of the present invention in a third position.

FIG. 3 shows the mobile stage system 2 transforming from the transport position to a second, deployed position. Here, the walls 12 and roof 14 are raised up on risers 22 which may be hydraulic arms or some other suitable device. Support legs 20 are deployed beneath the stage to provide additional support. The stage cover 16 and stage floor 18 unfold from the compact transport position and are separated by support towers 24. Here it can clearly be seen that the lower wall panels 10 provide a base which functions as a hand rail and prevents persons from falling over the edge of the stage while still permitting a view out the rear of the stage if necessary.

Figure 4:
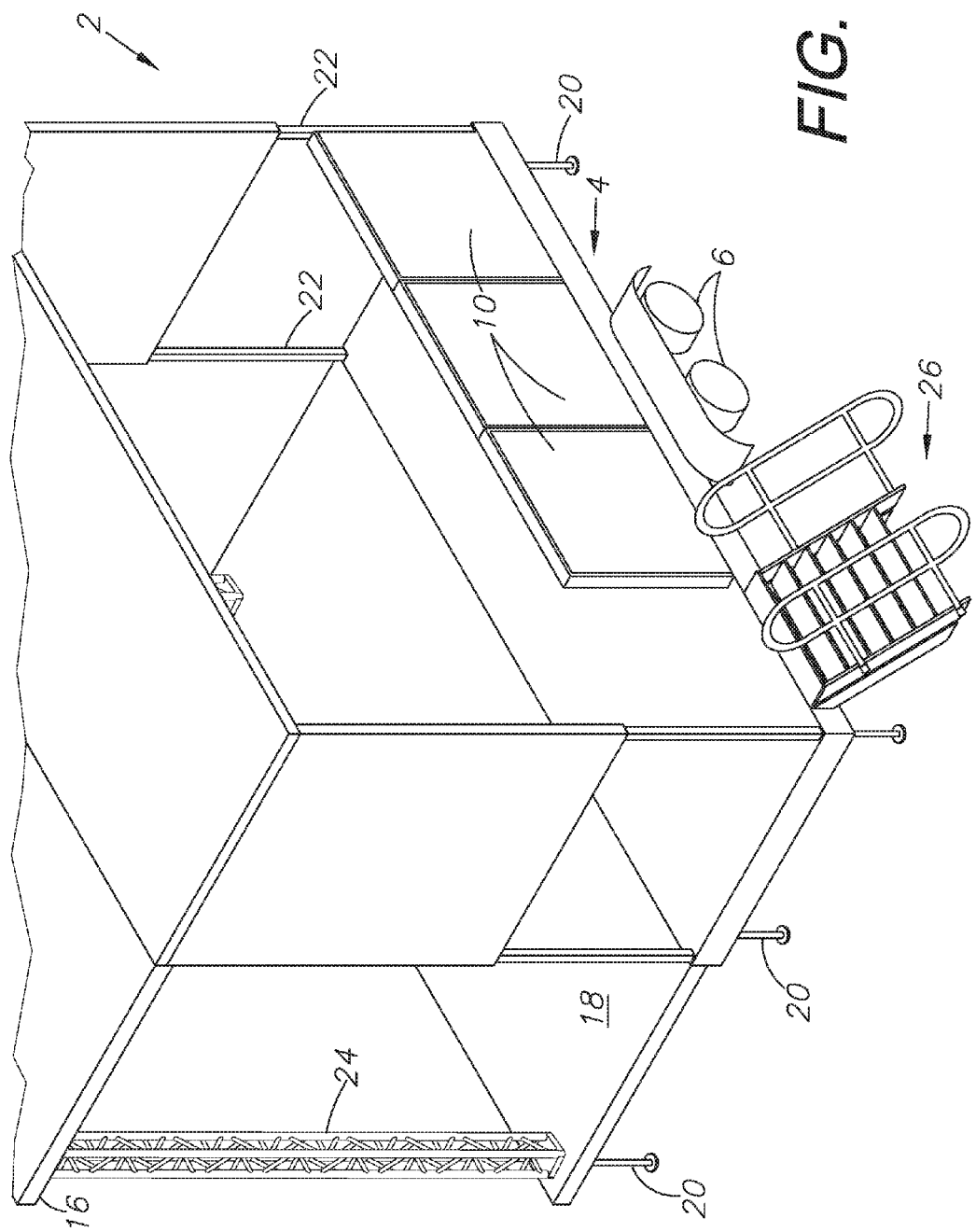
FIG. 4 is a three dimensional isometric view thereof, featuring an alternative arrangement including a removable stair component.

FIG. 4 shows how a modular stairway assembly 26 including hand rails could be inserted along the base of the stage into a slot left behind when a lower wall panel 10 is removed. Other devices may be inserted in such gaps as well, including stage extension panels, alternative hand rail assemblies or other desired elements. As shown, the stairway assembly 26 provides back stage access for performers or technicians away from the front stage platform 18 which faces the audience.

Figure 5:
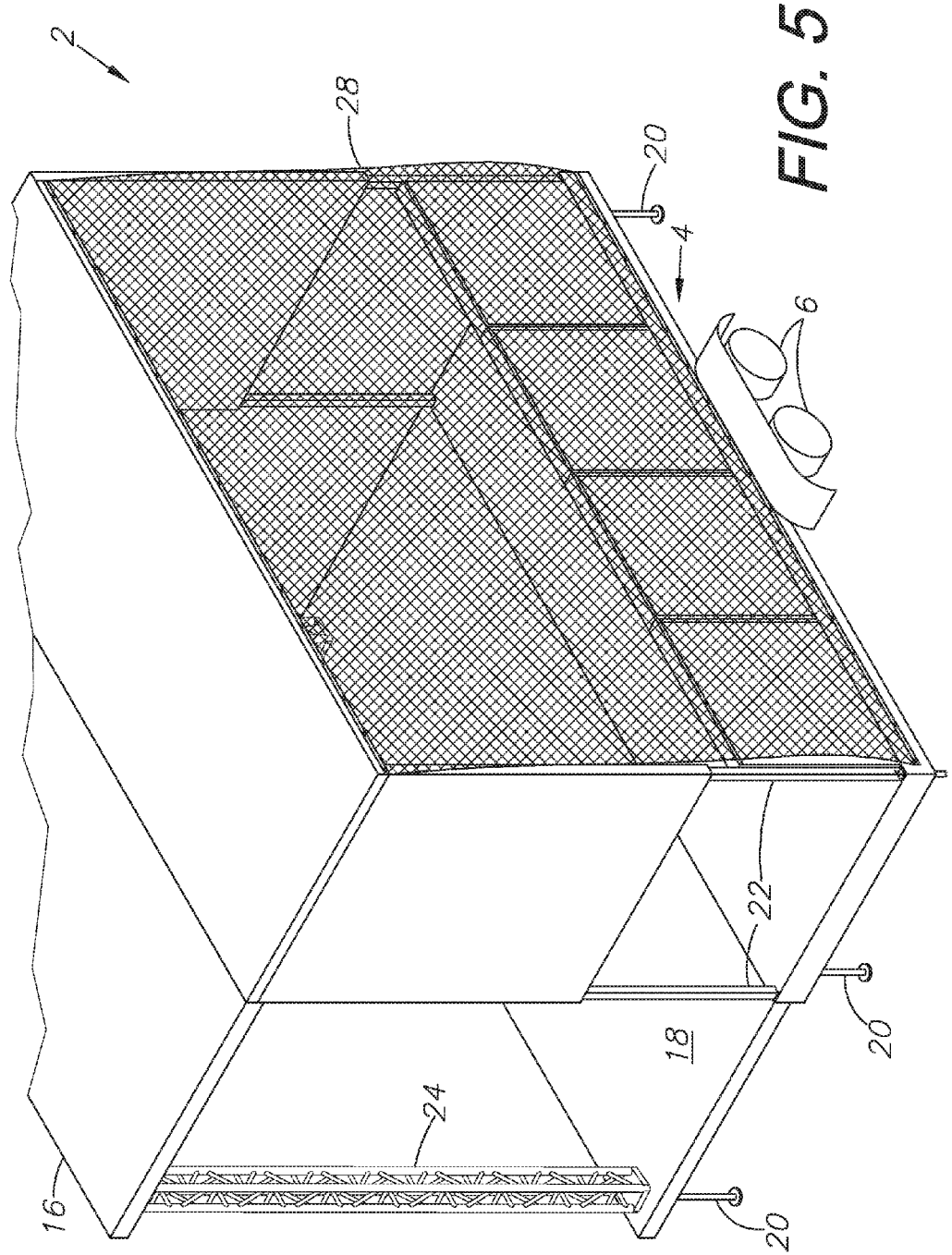
FIG. 5 is a three dimensional isometric view thereof, featuring an alternative arrangement including a removable screen component.

FIG. 5 shows a wind screen 28 which may be removably attached to the rear of the stage system 2 for providing a backdrop to the stage to prevent wind, rain, and other elements from entering the stage, to provide privacy to the back stage area, or to provide a screen upon which a projector or other device can project lights, images, videos, or other display elements. The screen 28 may be made of a solid material or a semi-permeable, mesh material or other suitable material. It can be attached to the stage walls 12 and roof 14 using screws, bolts, nails, hooks, hook-and-loop fasteners, or any other suitable non-permanent attachment.

Figure 6:
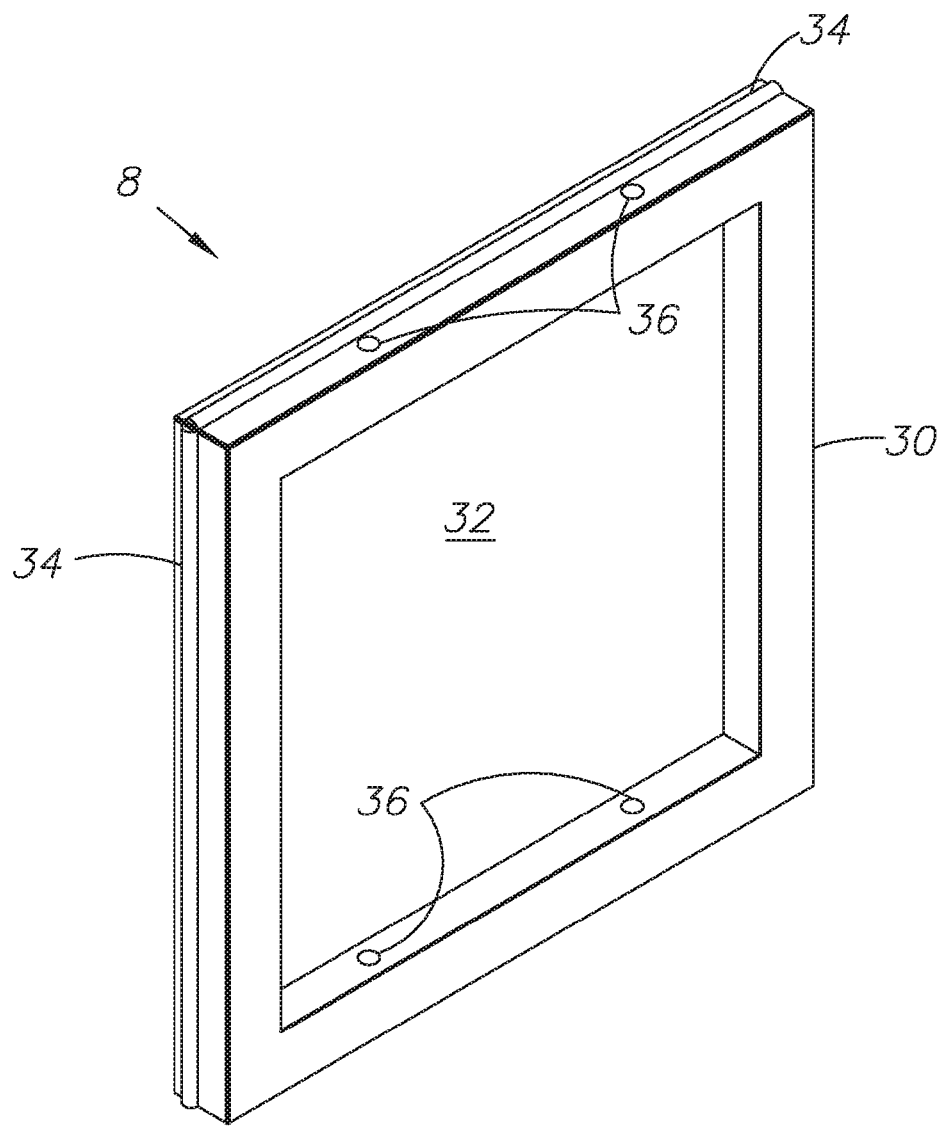
FIG. 6 is a three dimensional isometric view of a portion of a preferred embodiment of the present invention shown from an interior perspective.

FIG. 6 shows the interior face of an upper wall panel 8. The panel is generally constructed from a square or rectangular frame 30 made from tube metal and a face plate 32 attached to the exterior face of the panel 8. Bolt or pin holes 36 are located at the top and bottom edges of the frame 30 and receive bolts or pins for connecting the frame 30 to an adjacent upper 8 or lower 10 wall panel. Additional holes may be located on the sides of the frame for connecting to adjacent panels to the left and right. Other attachment elements could be used, including hooks, screws, hook-and-loop fasteners, straps, or other suitable devices.

Figure 7:
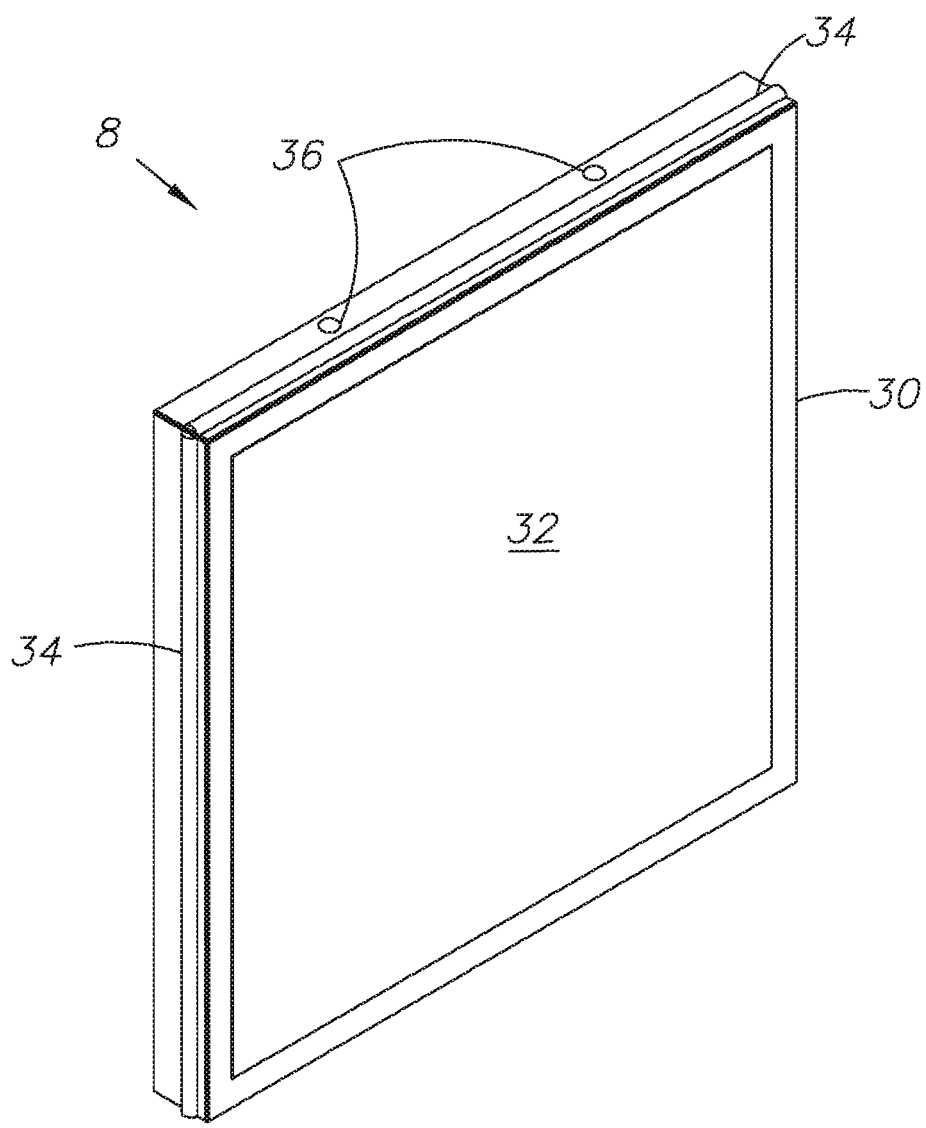
FIG. 7 is a three dimensional isometric view of a portion of a preferred embodiment of the present invention shown from an exterior perspective.

FIG. 7 shows the exterior face of the upper wall panel 8 which would be identical to the exterior face of the lower wall panel 10. As shown in both FIGS. 6 and 7, weather stripping 34 is placed onto the frame 30 and squeezes between the panels to prevent wind and other elements from penetrating the wall formed by the panel, keeping wind, rain, water, dirt, dust, and other elements from penetrating the wall formed by the panels.

Figure 8:
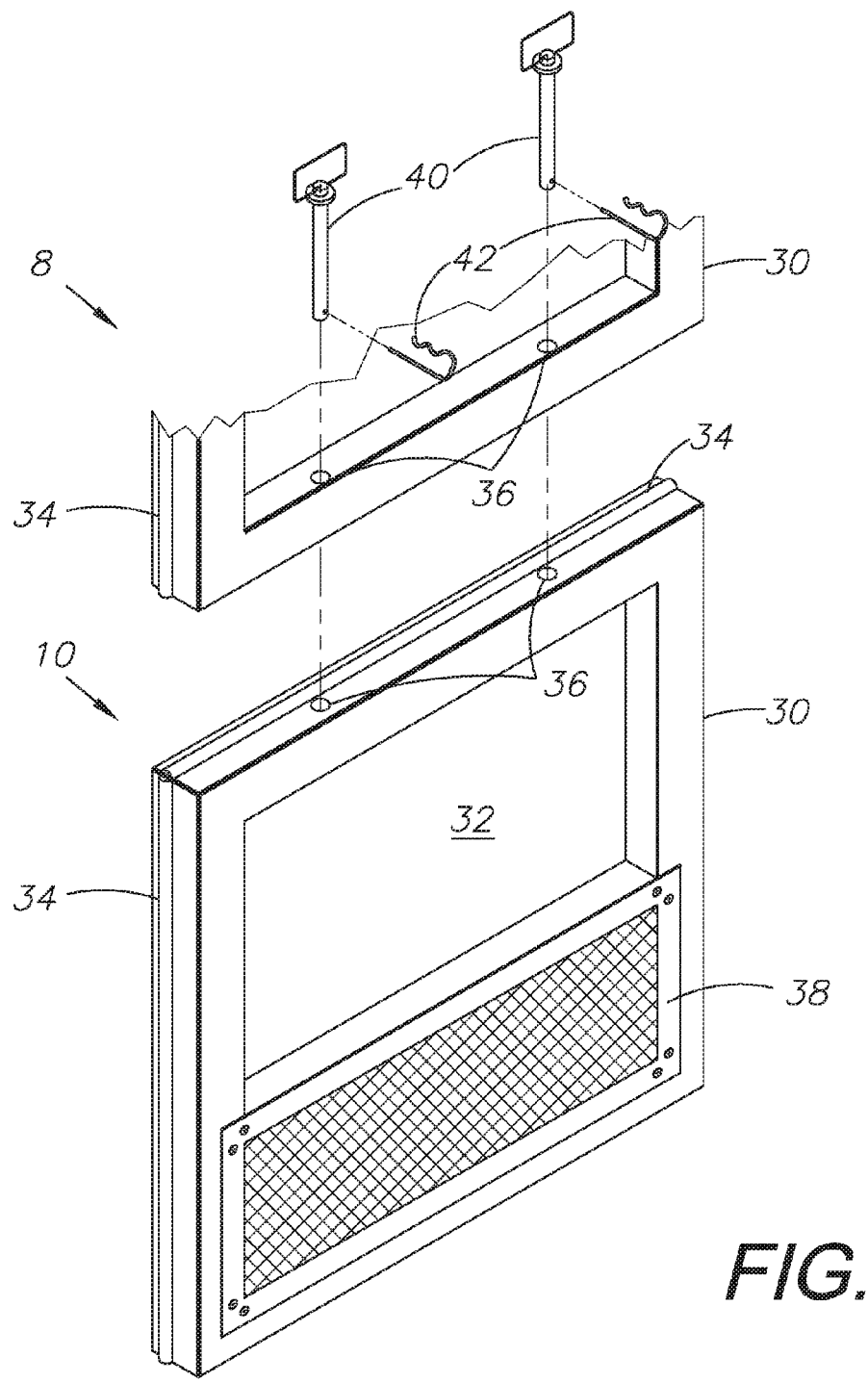
FIG. 8 is a three dimensional isometric view of a portion of a preferred embodiment of the present invention shown from an interior perspective and demonstrating how various components join together.

FIG. 8 shows how the upper 8 and lower 10 wall panels may be joined together. In the example as shown, long pins 40 are inserted through the receiver holes 36 of each respective panel and are secured using cotter pins 42. These could be replaced with bolts or any of the other options discussed previously. The interior face of the lower wall panel 10 differs slightly from the upper panels in that it includes a kick plate 38 for protecting the interior of the face plate 32 from being damaged by feet or equipment.

Referring back to FIG. 1, the present invention could be deployed using manual power, or it could be set up to include automated features for automatically raising the roof 14 and wall 12 structures using the risers 22 and may also automatically deploy the stage floor 18 and covering 16. This could be performed using a remotely controlled hydraulic system or electrical system including winches and hydraulic arms. A mobile computing device 44, such as a computer, touch-screen computer, smart phone, or other computing can be used to control the deployment or compacting of the mobile stage system 2. The mobile computing device 44 includes a processor 46, data storage 48 for storing a software application 52 associated with controlling the stage, and a wireless antenna 50 or other communicating element for communicating with a controller 54 associated with the stage. This controller could be a simple processor or computer solely responsible for receiving commands from the mobile computing device 44 and then operating the various devices which raise or lower the stage.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A mobile stage system comprising:
   a transport base including wheels configured for transporting a mobile stage;
   said mobile stage comprising a floor, a roof, two side walls, a rear wall comprised of a plurality of upper wall panels and lower wall panels, and a retractable stage area;
   said mobile stage configured to be transformed from a first, transport position to a second, deployed position;

said two side walls and said roof configured to be raised by a plurality of mechanical risers which lift said side walls away from said floor;
said upper wall panels configured to releasably engage a back edge of said roof;
said lower wall panels and upper wall panels configured to be modularly interchangeable;
said upper and lower wall panels connected via temporary connectors;
said lower wall panels configured to function as guard rails along a back edge of said floor;
said upper and lower wall panels including weather stripping affixed along edges of each respective panel;
said retractable stage area comprising a stage floor and a stage roof;
said stage floor configured to retract away from said floor; and
said stage roof configured to retract away from said roof.

2. The system of claim 1, further comprising:
each said upper wall panels comprising tubular metal forming a rectangular frame, a face plate affixed to an exterior face of said upper wall panel, and said weather stripping placed along outer faces of said tubular metal configured to engage adjacent said upper wall panels and said lower wall panels; and
each of said upper wall panels comprising a connector for releasably connecting to said edge of said roof.

3. The system of claim 1, further comprising:
each said lower wall panels comprising tubular metal forming a rectangular frame, a face plate affixed to an exterior face of said lower wall panel, a kick plate affixed to an interior face of said lower wall panel, and said weather stripping placed along outer faces of said tubular metal configured to engage adjacent said upper wall panels and aid lower wall panels; and
each of said lower wall panels comprising a top edge of said rectangular frame configured to function as a hand rail.

4. The system of claim 1, further comprising:
a flexible screen releasably engaged along a back edge of said side walls and said back edge of said roof after disengagement of said upper wall panels from said back edge of said roof; and
wherein said flexible screen is configured to cover an area between said side walls, said roof, and said lower wall panels.

5. The system of claim 1, further comprising:
said lower floor panels being selectively removable; and
a stairway assembly including at least one hand rail configured to engage a space vacated by one of said lower wall panels.

6. The system of claim 1, further comprising:
a mobile computing device including a processor, data storage, an antenna, and a software application configured to operate the mobile stage system, said software application stored within said data storage and operable by said processor;
a controller affixed to said mobile stage system, said controller configured to transform said mobile stage system from said first, transport position to said second, deployed position by operating said risers and said retractable stage portion; and
whereby said controller is remotely controlled by said mobile computing device.

7. A method of deploying a mobile stage, the method comprising the steps:
positioning a transport base at a desired location, said transport base including wheels configured for transporting a mobile stage comprising a floor, a roof, two side walls, a rear wall comprised of a plurality of upper wall panels and lower wall panels, and a retractable stage area;
raising said roof and said two side walls using a plurality of mechanical risers;
extending said retractable stage area such that an extension floor is deployed in front of said floor of said mobile stage, and such that an extension roof is deployed above said extension floor and extending away from said roof of said mobile stage;
removing said upper wall panels;
removing at least one of said lower wall panels replacing said at least one of said lower wall panels with a stairway assembly including at least one hand rail;
each said upper wall panels comprising tubular metal forming a rectangular frame, a face plate affixed to an exterior face of said upper wall panel, and said weather stripping placed along outer faces of said tubular metal configured to engage adjacent said upper wall panels and said lower wall panels; and
each of said upper wall panels comprising a connector for releasably connecting to an edge of said roof.

8. The method of claim 7, wherein said upper and lower wall panels including weather stripping affixed along edges of each respective panel.

9. The method of claim 7, wherein:
each said lower wall panels comprising tubular metal forming a rectangular frame, a face plate affixed to an exterior face of said lower wall panel, a kick plate affixed to an interior face of said lower wall panel, and said weather stripping placed along outer faces of said tubular metal configured to engage adjacent said upper wall panels and aid lower wall panels; and
each of said lower wall panels comprising a top edge of said rectangular frame configured to function as a hand rail.

* * * * *